Sept. 27, 1955     R. N. KIRCHER     2,719,212
PERCOLATOR HEATER
Filed Dec. 13, 1952
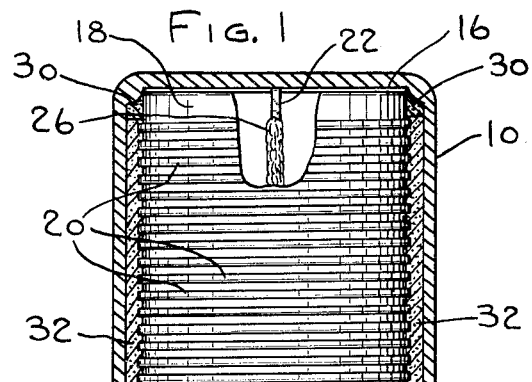
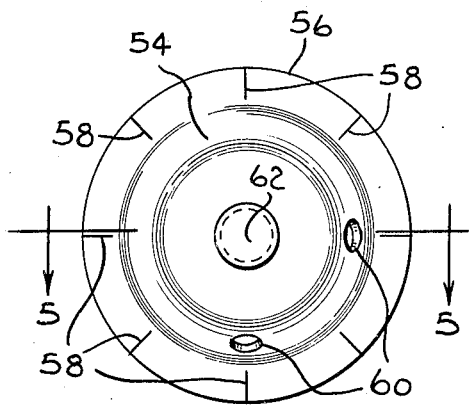
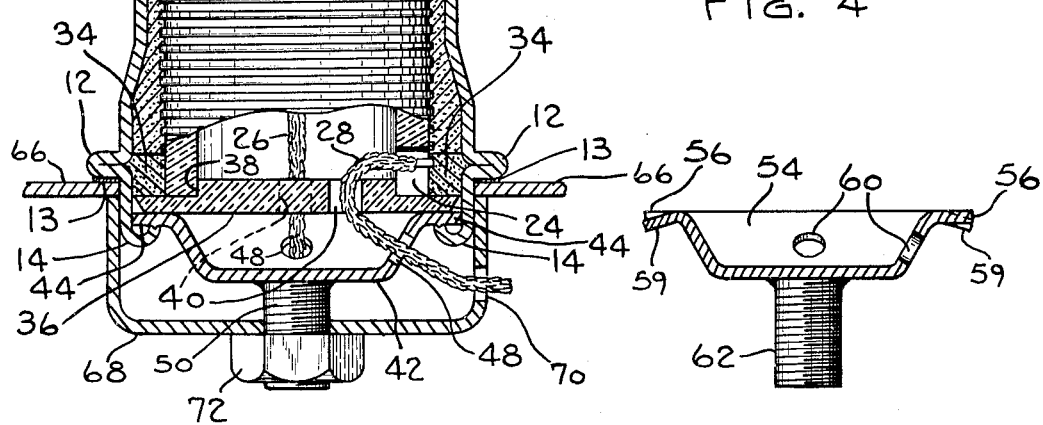
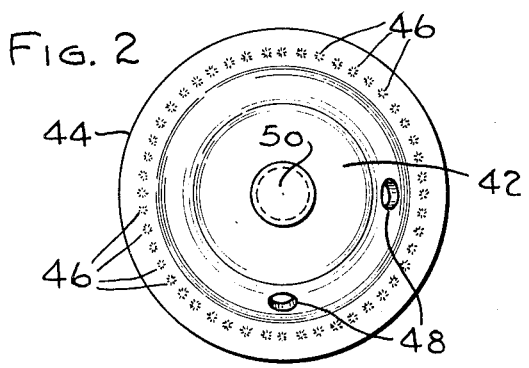
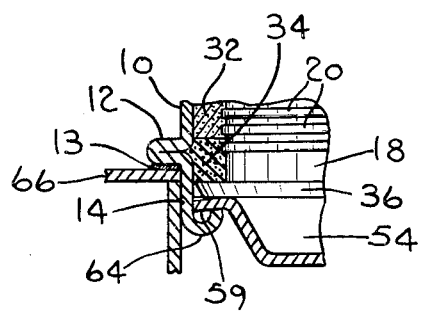
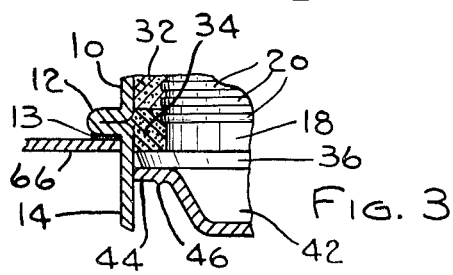
*INVENTOR.*
RALPH N. KIRCHER
BY
*John W. Michael*
ATTORNEY

2,719,212
PERCOLATOR HEATER

Ralph N. Kircher, West Bend, Wis., assignor to West Bend Aluminum Co., West Bend, Wis., a corporation of Wisconsin Application December 13, 1952, Serial No. 325,759

5 Claims. (Cl. 219—41)

This invention relates to improvements in immersion heaters, particularly to the type adapted for use in coffee percolators.

In previous heaters of this type the mounting stud extends interiorly throughout the length of the housing and projects from the bottom thereof. Such construction is not economical. Furthermore, the stud transfers heat downwardly, resulting in undesirable heat loss.

It is an object of this invention therefore to provide a heater which is economical to construct, easy to install, and efficient.

This object is obtained by securing the mounting stud to a cover fitted within an opening at the bottom of the housing and crimping the edge of such opening over such cover to hold it in place. The cover is provided with serrations, raised edges or other projections which will engage the edge of the crimped portion to resist turning the cover relative to the body. The cover is pressed against a ceramic washer resting on the lower end of a ceramic tube on which is mounted the ribbon type heating element. No part of the mounting stud extends within the heater and thus there is no detrimental downward transmission of heat.

The novel features, which are considered characteristic of the invention, are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 1 is a view partly in vertical cross-section and partly in plan elevation of a percolator heater embodying the present invention;

Fig. 2 is a bottom plan view of the cover for the heater housing disengaged from such housing;

Fig. 3 is a fragmentary sectional view showing the cover assembled in the opening of the casing prior to the crimping of the edge thereof;

Fig. 4 is a bottom plan view of a modified form of cover for the heater casing disengaged from such casing;

Fig. 5 is a sectional view taken on the line 5—5 of Fig. 4; and

Fig. 6 is a fragmentary sectional view showing the cover of Figs. 4 and 5 assembled in the opening of the casing.

Referring to the drawings, the percolator heater is shown mounted within a container or percolator by being secured within a hole in the bottom 66. The flange on the heater is pressed against a thin washer 13 to form a seal between the heater and such bottom by a holding shell 68 abutting the outer surface of the bottom 66 under the pressure applied by a nut 72 on the mounting stud of the heating element acting between such stud and such shell. This method of mounting and sealing the heater is standard practice and is shown merely to illustrate the mounting of the heater in a vessel.

The heater has an aluminum case or housing 10 of general cylindrical shape with an imperforate top. Adjacent the lower end the wall of the housing is formed outwardly as shown to provide an annular flange 12. This flange provides a support for the heater and forms a seal between such heater and the bottom 66. A neck 14 on the housing extends below the flange 12 and defines a bottom opening. Interiorly of the housing the top is recessed to form a seat or shoulder 16 which engages the upper end of a ceramic tube 18 to center said tube spaced from the side wall of the housing. This tube carries a spirally wound resistance ribbon forming a heating element 20. The tube 18 has an upper notch 22 and a lower notch 24 permitting the passage to the interior of such tube of insulated braided copper lead wires 26 and 28 connected to the ends of the heating element 20.

After the tube 18 is inserted in the housing 10, while inverted and centered as described, a ring 30 of high temperature cement is placed in the tube to more securely hold the upper end of the tube in proper position. The space between the wall of the housing and the outer surface of the tube is then filled with magnesium oxide 32 in powder form. The magnesium oxide is a good conductor for heat and transfers heat from the element 20 to the housing with minimum loss. The magnesium oxide is held in place and the lower end of the tube 18 is more securely held by a ring 34 of high temperature cement forced down on the oxide between the tube and the housing. A rigid ceramic washer 36 is then fitted within the opening. It has a centering lug or shoulder 38 fitting within the end of the tube 18 to center such end within the housing. Such washer may be pressed in place before the cement is set. This washer has a pair of holes 40 out through which the leads 26 and 28 pass. The ceramic washer provides a backing for a metal cover 42 and also acts as an insulating barrier to stop downward radiation of heat.

The dish shaped metal cover 42 fits within the neck 14 and has a peripheral flange 44 from the lower surface of which projects a plurality of serrations 46. Such cover also has a pair of holes 48 through which the leads 26 and 28 extend to the outside of the heater. There is staked or welded to the cover 42 a threaded mounting stud 50. This stud, as before described, supplies mounting pressure to the heater by clamping the bottom 66 between the flange 12 and shell 68. To hold the cover 42 assembled in the casing 10, the end of the neck 14 or material around the bottom opening is crimped inwardly and upwardly against the flange 44. The end of the crimped portion is frictionally engaged by the serrations 46 to prevent relative rotation between the cover and the casing particularly when turning force is applied to the stud 50 during tightening of the nut 72.

A heater constructed as thus described may be readily assembled in the manufacture thereof and is adapted for quick installation in a container. The unique method of holding the cover 42 to the casing 10 eliminates the necessity of having the mounting stud 50 project into the interior of the heater. This eliminates undesirable heat loss being transmitted through such stud. The ceramic washer 36 acting as an insulating wall further aids in preventing undesirable downward radiation of heat from the heater.

In place of the serrations 46 the cover may be provided with inherently biased downwardly projecting sharp edges which are frictionally engaged by the crimped over end of the neck to prevent relative rotation between housing and cover. This modification is shown in Figs. 4 to 6, inclusive. The cover 54 of this modification is made of metal dish shaped substantially like that previously described. It has a peripheral flange 56 provided with a plurality of radially extending spaced slits 58. One of the two edges formed by each of such slits is depressed downwardly as indicated at 59 to provide a resiliently biased downwardly projecting sharp edge. The cover 54 has holes 60 for the wire leads 26 and 28 and a threaded mounting stud 62 secured thereto in the same manner as heretofore described. The cover 54 is fitted within the bottom opening of the casing 10 in the same manner as the cover 42. However, in this modification the end of the crimped over portion 64 presses against the sharp edges 59 to frictionally engage such edges to prevent relative rotation between cover and casing. The offset edges are pressed upwardly during the crimping and there is thus induced an inherent force which cushions the crimping pressure and maintains a substantially even clamping pressure under expansion and contraction which takes place during use.

With the heater installed as described, the insulated leads 26 and 28 extend outwardly through holes 70 in the holding shell 68 to be connected with suitable electrical controls and source of energy.

Although several embodiments of the invention are shown and described herein, it will be understood that this application is intended to cover such other changes or modifications as come within the spirit of the invention or scope of the following claims:

I claim:

1. In a heater for a coffee percolator or the like, a casing having an opening at the bottom thereof, a heating element in said casing including a rigid mounting member, a cover in said opening resting against said member and having an outer surface provided with a downwardly facing integral projection, said casing having the edge surrounding said opening crimped over said cover and bent to face upwardly against said projection, and a mounting stud secured to said cover and projecting downwardly therefrom.

2. In a heater for a coffee percolator or the like, a casing having an opening at the bottom thereof, a flange on said casing adjacent said opening, a heating element in said casing including a rigid mounting member, a cover in said opening resting against said member and having an outer peripheral surface, said surface having downwardly facing integral serrations, said casing having the edge surrounding said opening crimped inwardly and upwardly against said cover to press said cover against said mounting member and engage said serrations to prevent rotation of said cover relative to said casing, and a mounting stud secured to said cover and projecting downwardly therefrom.

3. In a heater for a coffee percolator or the like, a casing having an opening at the bottom thereof, a flange on said casing adjacent said opening, a heating element in said casing including a rigid mounting member, a cover in said opening having a flange resting against said member, a plurality of slits in said flange, one of the edges formed by each slit being depressed relative to the plane of said flange to present a sharp edge resiliently biased downwardly, said casing having the edge surrounding said opening crimped inwardly and upwardly against said cover to press said cover against said mounting member and engage said sharp edges to prevent rotation of said cover relative to said casing, and a mounting stud secured to said cover and projecting downwardly therefrom.

4. A heater for a coffee percolator comprising an aluminum housing having an imperforate top and an opening at the bottom, said housing having an annular flange adjacent said opening, said top having an internal shoulder, a ceramic tube having a heating element on the outside thereof, said tube being positioned in said housing and abutting said shoulder to properly center said tube spaced from the sides of said housing, a ceramic washer fitted within said opening, said washer having a shoulder thereon engaging with the lower end of said tube to center said tube spaced from the sides of said housing, a metal cover fitted in said opening and resting against said washer, the edge of said housing surrounding said opening being crimped over said cover to hold said cover in place, and a threaded mounting stud secured to said cover and projecting outwardly therefrom.

5. A heater as claimed in claim 4 in which there is a ring of high temperature cement between the upper edge of said tube and said housing, a filling of magnesium oxide between said tube and the side wall of said housing, and a ring of high temperature cement between the lower edge of said tube and said housing.

References Cited in the file of this patent

FOREIGN PATENTS 472,872  Canada _____ Apr. 17, 1951